INVENTOR.
LYNN M. HARTON

BY Robert T. Casey

ATTORNEY

Dec. 26, 1967 L. M. HARTON 3,360,602
ELECTRIC POWER BUSWAY HAVING A HOUSING WITH SIDEWALLS
CONNECTED TOGETHER WITH RESILIENT TIE PLATES
Filed Aug. 5, 1966 2 Sheets-Sheet 2

INVENTOR.
LYNN M. HARTON
BY Robert P. Casey
ATTORNEY

United States Patent Office 3,360,602
Patented Dec. 26, 1967

3,360,602
ELECTRIC POWER BUSWAY HAVING A HOUSING WITH SIDEWALLS CONNECTED TOGETHER WITH RESILIENT TIE PLATES
Lynn M. Harton, Avon, Conn., assignor to General Electric Company, a corporation of New York
Filed Aug. 5, 1966, Ser. No. 570,599
7 Claims. (Cl. 174—68)

My invention relates to electric power busway systems, and particularly to an electric power busway system of the type comprising a plurality of busbars in side-by-side insulated relation within a metallic housing closely surrounding the busbars.

In co-pending application Ser. No. 570,504, filed Aug. 5, 1966, filed concurrently herewith and assigned to the same assignee as the present invention, an electric power busway system is disclosed comprising a plurality of relatively wide, thin flat busbar conductors, each coated with a relatively thin coating of insulating material and placed in directly side-by-side contacting relation. A metallic housing closely surrounds the busbar assembly. The opposite side walls of the housing are reinforced and tied together by a novel construction in the direction of possible expansion due to short-circuit forces, whereby the ability of the system to withstand short circuit current is increased, and the necessity for separately tying the bars together in a group within the housing is eliminated.

While the busway of the aforesaid application has been found capable of withstanding short-circuit currents of high magnitudes, it has been found that when a certain extremely high magnitude is reached, the magnetic forces associated with the current force the sides of the housing apart slightly and cause a permanent bend to occur in the walls of the enclosure.

Further, in order to improve the thermal contact between the housing and the busbars, the housing side wall members are provided with an initial bowed configuration. Because of this, certain difficulties are encountered in assembling the housing since the tie-plate members extend at right-angles to the plane of the side of the busbar assembly, whereas the side plate members are initially bowed, placing the rib members at an angle to such plane.

It is an object of the present invention to provide an electric power busway system of the type described which is capable of withstanding high short-circuit currents without incurring permanent bending or distortion of the enclosing housing or other parts.

It is another object of the invention to provide an electric power busway of the type described which includes a housing having means for permitting the contained busbars to separate slightly under short circuit current conditions, whereby the reactance of the system is increased, exerting a "current-limiting" effect on the short-circuit current.

In accordance with the invention in one form, an electric power busway system is provided including a plurality of electric power busbars supported in insulated side-by-side relation and maintained in such side-by-side relation by a metallic housing. The metallic housing includes top and bottom "tie-plate" members which interconnect opposed side members. The top and bottom tie-plate members each include an intermediate offset portion permitting resilient elongation, whereby the side wall portions of the housing are permitted to move apart a short distance by resilient deformation of the intermediate offset portions of the tie-plates. As the opposed side walls of the housing move apart, the reactance of the system increases, limiting the amount of short-circuit current permitted to flow. After the short-circuit current is removed, the resilience of the intermediate offset portions of the tie-plates acts to move the sidewall members back to their original condition in intimate thermal contact with the sidewall surfaces of the busbar conductors.

In accordance with another aspect of the invention, the side members have intermediate U-shaped cross-section rib formations and the tie-plate members have the outer or edgewise portions thereof deformed at an angle conforming to the angle of the intermediate U-shape cross-section rib portions of the side members, thereby facilitating the entry of the edge portions of tie-plate members into the rib portions during the assembly process. Following assembly, the opposite sidewall members are maintained in flat planar relation by being held tightly against the flat planar surfaces of the outer busbar conductors, and therefore, the edgewise portions of the tie plates and the U-shaped offset portions of the side members are both maintained substantially perpendicular to the plane of the busbar conductor sides.

The invention will be more fully understood from the following detailed description, and its scope will be pointed out in the appended claims.

Figure 1:
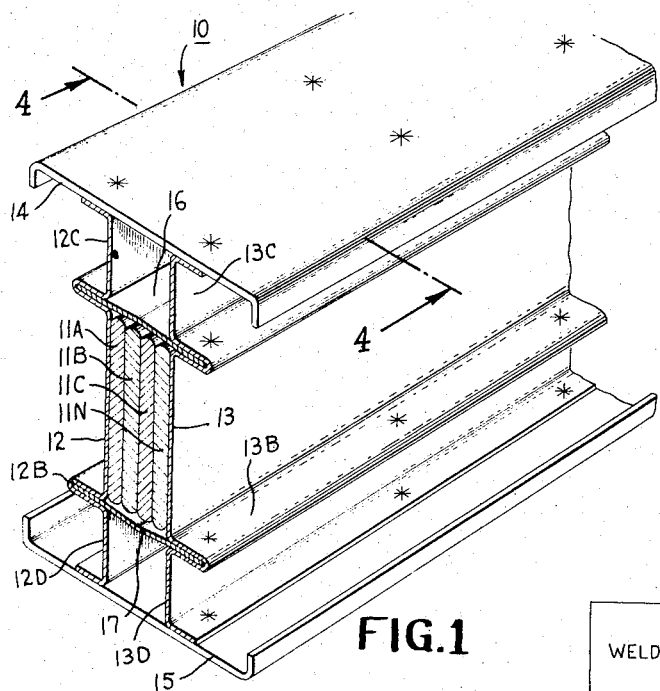
FIGURE 1 is a perspective view of a busway section incorporating the invention.

Referring to the drawings, the invention is shown in FIGURE 1 as incorporated in an electric power busway section indicated generally at 10 and including a plurality of relatively wide, thin, flat busbar conductors 11A, 11B, 11C and 11N. Each of the busbar conductors 11A, 11B, 11C, and 11N, is covered with a relatively thin coating of electric insulating material. (The insulating coating is not separately shown and numbered in the drawings since in the scale utilized it is not practicable to do so.)

The busbar conductors 11A, 11B, 11C, and 11N are contained within an elongated housing formed of relatively thin sheet metallic material and comprising opposite side members 12 and 13. The housing side plates 12 and 13 have intermediate offset and return-bent portions 12A, 12B, 13A, 13B and also extensions 12C, 12D, and 13C, 13D, terminating in outwardly directed flange portions 12C′, 12D′, 13C′, and 13D′ as shown particularly in FIGURE 2.

The side plate members 12 and 13 are interconnected by top and bottom plate members 14 and 15 which are suitably attached such as by welding to the outwardly directed flange portions 12C', 13C', 12D', and 13D', respectively. The intermediate offset portions 12A, 13A, and 12B, 13B of the side plates 12 and 13 are interconnected by tie plate members 16 and 17 respectively. In accordance with the invention, the tie plates 16 and 17 have intermediate portions deformed or offset for a purpose to be described.

Figure 3:
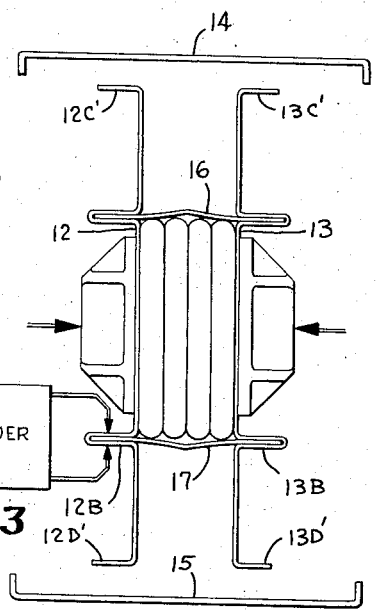
FIGURE 3 is a view similar to FIGURE 2 showing the parts thereof during assembly, the top and bottom plate members being shown in exploded relation.
Figure 2:
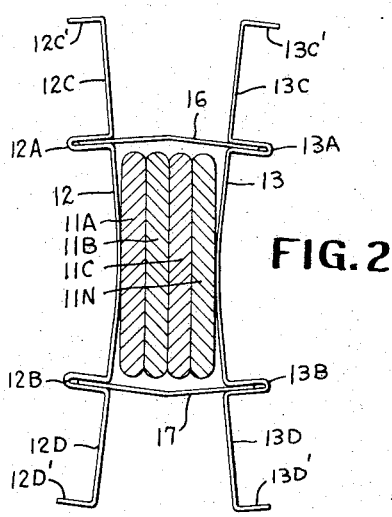
FIGURE 2 is a sectional view, showing the parts in the condition and position which they occupy just prior to final assembly.

Referring to FIGURES 2 and 3, the method of assembly of the busway of the present invention will now be described.

The side wall members 12 and 13, as shown in FIGURE 2, in their free condition, are bowed slightly in a direction outwardly of the busbar assembly so that the midportions thereof are closer together than the outer portions.

In the assembly process, the side members are placed against the outer side surfaces of the busbar assembly, and force is applied, as indicated in FIGURE 3 to the side wall surfaces forcing them against the outer flat surfaces of the outer pair of busbar conductors. This causes the edge portions of the tie plates 16 and 17 to enter the U-shape cross section portions of the side plates 12 and 13, to which they are then fixedly attached by suitable means, such as by welding.

Figure 4:
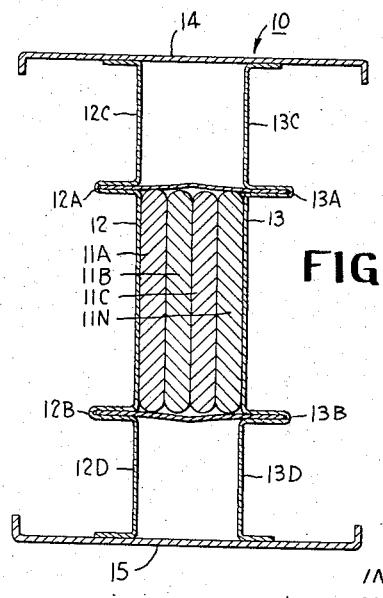
FIGURE 4 is a sectional view of the busway section of FIGURE 1, taken substantially on the section indicated by the line 4—4 of FIGURE 1.

Because of the initial bowed configuration of the side plate members, these members, although restrained in flattened condition in the finally assembled structure, as shown in FIGURE 4, retain an inherent resilient bias which causes the intermediate or central portions thereof to be tightly urged against the outer busbar conductors, thus providing high thermal transfer and "pre-stressed" force resistance ability, as set forth in the above-mentioned patent application.

As indicated in FIGURE 4, the intermediate portions of the tie plate members 16 and 17 remain slightly offset in the assembled condition. It has been found that this offset provides resilience which permits the opposite side walls 12 and 13 to move apart slightly when the bus section is subjected to high short-circuit current. This in turn permits the busbar conductors 11A, 11B, etc. to move apart slightly, substantially increasing the reactance of the system and limiting the short-circuit current which flows.

Figure 6:
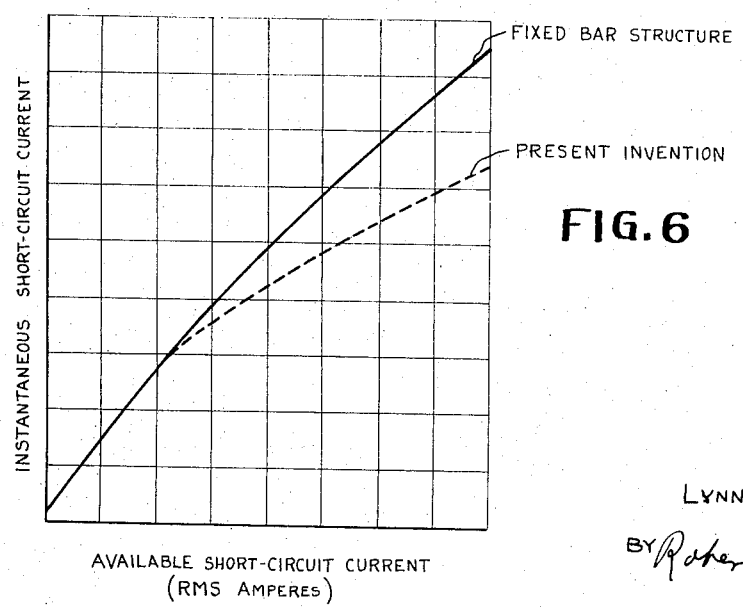
FIGURE 6 is a graph of short-circuit current values for a busway constructed with fixed-spacing bars vs. short-circuit current values under the same test conditions for the present invention.

Referring to FIGURE 6, there is shown a graph of instantaneous *peak* short-circuit current values corresponding to various values of short-circuit current "available." (The "available" short-circuit current may vary depending on the size and nature of the power source.) Thus a particular point on this graph represents a particular value which is the highest value that short-circuit current flowing through a particular test apparatus may be expected to rise to when that apparatus is connected to a power source having the ability to deliver the number of RMS amperes of short-circuit current under dead-short conditions, i.e., when a bolted connection is made directly across the output terminals of the source. Curve A represents such instantaneous peak short-circuit current values when the apparatus tested is a busway substantially as shown herein but with the bars not permitted to move apart during the short-circuit test. This curve is based on calculations, and the values double-checked by actual tests which showed no wide divergence from the calculated curve.

It will be observed that with such busway constructions, the peak short-circuit current increases virtually linearly with increasing "available" values.

Curve B represents the instantaneous peak short-circuit current values found by testing sample busway constructed in accordance with the present invention. It will be observed that as the "available" short-circuit current is increased, the peak short-circuit current values experienced by the tested busway do not increase as rapidly.

Thus at high values of available short-circuit current, the actual peak current observed during tests is substantially below the values which would ordinarily be expected to occur at such available levels. It is believed that this difference is due to the fact that the bars are permitted to move apart slightly when the magnetic forces associated with such currents become great enough. This increases the reactance of the system in accordance with the well-known rule that reactance between parallel conductors varies directly with the distance between such conductors, as per the formula:

$$X_L = K \log_n \frac{D}{k}$$

Where D is the geometric mean distance between the conductors of a given configuration.

It is important to note that the initial separation of conductors in the present invention is intentionally made extremely small, for the purpose of normally maintaining reactance at a minimum. Thus in the embodiment illustrated, the separation between adjacent bars is normally only about .050 inch. Thus the total separation between the "phase" bars 11A and 11B, and between 11B and 11C is about .100 inch. (Bar 11N is ordinarily a neutral bar and does not carry significant current.)

It will be observed therefore that the total significant spacing affecting reactance can be doubled in this assembly by an expansion of the housing side walls of only about .100 inch.

Figure 5:
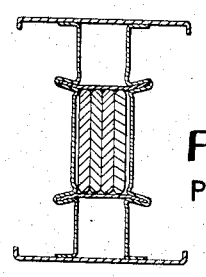
FIGURE 5 is a sectional view similar to FIGURE 4 showing a section of prior art busway following the subjection thereof to a short-circuit current in excess of the capacity of the housing material to withstand without permanent deformation.

As indicated in FIGURE 5, excessive short-circuit currents have been found to cause distortion in prior design busways, particularly adjacent the intermediate offset U-shape cross-section portions 12A, 12B, 13A, and 13B. Electric power busway constructed in accordance with the present invention, on the other hand, show no signs of such permanent distortion after being subjected to the same test conditions.

It will be appreciated that the amount of resilience in the tie plate members 16, 17 can be greatly varied by varying the degree of offset, the radius of bend, thickness of material, etc. In the preferred form of the invention, as illustrated in FIGURE 4 only a slight amount of offset is utilized. Thus a portion of the forces created by short-circuit currents are utilized in straightening out the tie plate members 16 and 17, following which, no further separation of tie plates can occur. The short-circuit current is, however, decreased slightly by this time because of the permitted separation of the busbar conductors 11A, etc. Such reduced force does not thereafter cause permanent deformation of the housing. It will be appreciated however, that, if desired, sufficient resilience may be provided in the plates 16 and 17 so that the limit of such resilience is not reached during such short-circuit current conditions.

Apart from the fact that the configuration of the tie plates 16 and 17 shown in FIGURE 2 provides the intermediate offset structure as shown in FIGURE 4, this configuration also has another aspect useful in the process of assembly of the structure.

In accordance with this aspect, the edge portions of the tie plates 16 and 17 are directed at an angle slightly less than a right angle with respect to the plane of the side walls of the conductors 11A, etc. This angle coincides with the angle of the intermediate offset portions 13A, etc. of the side members 12 and 13. Accordingly, during the assembly process, as the side members 12 and 13 are flattened by force exerted thereagainst as previously described and illustrated in FIGURE 3, the edge portions of the plate members 16 and 17 readily enter into the U-shaped portions 13A, etc., thus greatly facilitating assembly of the structure. When the side plate members 12 and 13 are flattened by the application of force, the edgewise portions of the separator members are deflected slightly to the true 90 degree relation to the planes of the side surfaces of the conductors.

Figure 7:
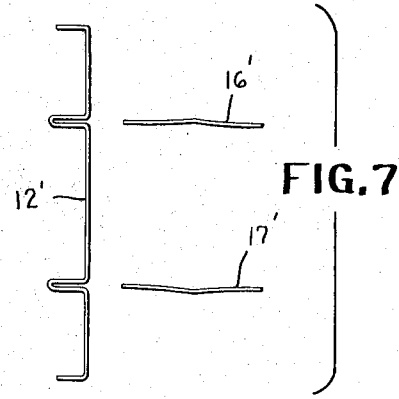
FIGURES 7 and 8 illustrate another embodiment of the invention suitable for use with a busway section which does not have the side wall portions initially bowed.
Figure 8:
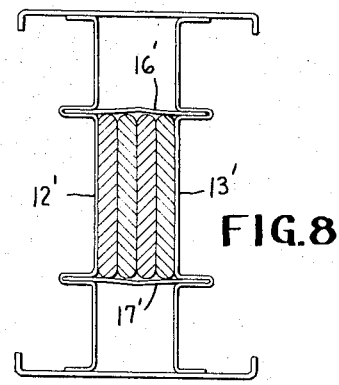

In accordance with the invention, embodiments of the invention may be provided utilizing either the short-circuit current restricting feature or the assembly-facilitating feature, alone as desired. Thus in FIGURES 7 and 8 there is illustrated another embodiment of the invention including a modified tie-plate construction 16', 17' which may be used with side plate members 12', 13' which are initially of flat construction, rather than bowed. It will be observed that in the final construction, as illustrated in FIGURE 8, the tie-plate member 16', 17' still perform the function of providing the intermediate offset characteristic which absorbs some of the short-circuit current forces as previously described.

Figure 9:
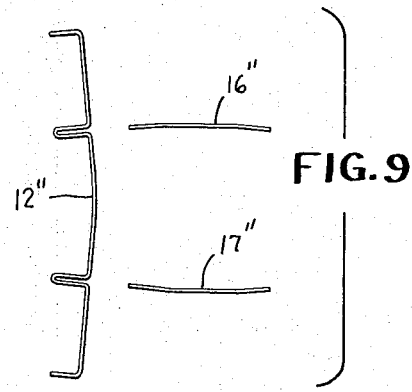
FIGURES 9 and 10 illustrate another embodiment of the invention permitting ready assembly even though the side wall members are in initially outwardly-bowed configuration.
Figure 10:
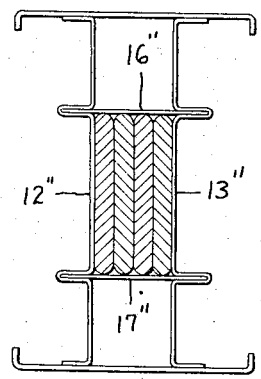

In FIGURES 9 and 10, on the other hand, there is shown an embodiment of the invention including modified tie plates 16", 17" having their intermediate portions flat and only the edge portions thereof bent at an angle thereto. This form is particularly suitable for use with tie plates 12", and 13" of the outwardly bowed type of construction, the final assembly being as indicated in FIGURE 10. It will be noted that in this assembly the tie-plates 16", 17" do not have an intermediate offset portion. The initial tie plate construction as illustrated in FIGURE 9, however still provides the substantial benefit of facilitating assembly of the busway.

While the invention has been shown in only three particular embodiments, it will be obvious that many modifications thereof may readily be made. Thus for example, one or more of such busbars may be uninsulated, and more or less than four bars may be used. I therefore intend by the appended claims to cover all such modifications as fall within the true spirit and scope of the invention.

What I claim as new and desire to secure by Letters Patent of the United States is:

1. An electric power busway section comprising:
   (a) an elongated housing including a pair of elongated spaced side wall members and means interconnecting said side wall members;
   (b) a plurality of electric power busbars supported in side-by-side insulated relation in said housing in a row between said side wall members;
   (c) said side wall members acting on said plurality of busbars to retain said busbars in said side-by-side relation against the force of short-circuit currents tending to drive said busbars apart;
   (d) said interconnecting means including means resiliently resisting separating movement of said side walls whereby said busbars are permitted to move a small distance apart under the effect of short-circuit currents against the bias of said resisting means, said side walls moving away from each other against said resisting means of said interconnecting means when said busbars are subjected to said short-circuit current forces whereby to increase the reactance of said busbar section and to limit said short-circuit currents.

2. An electric power busway apparatus comprising:
   (a) an elongated housing comprising a pair of spaced side wall members and means interconnecting said side wall members at a plurality of points along the length thereof;
   (b) a plurality of elongated electric power busbars supported in side-by-side insulated relation within said housing in a row extending between said spaced side wall members;
   (c) said side wall members normally acting to retain said busbars in said side-by-side relation against the force of short-circuit currents tending to drive said busbars apart;
   (d) said means interconnecting said side wall members comprising means extending between said side wall members above and below said plurality of busbars respectively, said interconnecting means including means resiliently resisting movement of said sidewall members away from each other, said side wall members being movable apart away from each other against said resisting means of said interconnecting means when said busbars are subjected to said short-circuit current forces whereby to increase the reactance of said busbar apparatus and to limit said short-circuit currents.

3. Electric power busway apparatus comprising:
   (a) a plurality of insulated electric power busbars supported in side-by-side relation;
   (b) an enclosure of relatively thin sheet metallic material, said enclosure comprising a pair of generally planar opposed side portions extending along opposite sides of said busbars respectively;
   (c) a pair of intermediate tie plates extending between said opposed side portions;
   (d) means connecting said tie plates to said opposed side portions at a multiplicity of points along the length thereof;
   (e) said tie plates each having an intermediate portion offset;
   (f) separation of said busbars being resisted by said side portions and separation of said side portions being resiliently resisted by said intermediate offset portions of said tie plates.

4. An electric power busway section as set forth in claim 1 wherein:
   (a) said busbars are provided with a relatively thin coat of insulating material and said side wall members are directly in contact with said insulated coating on said outside busbars and said busbars are directly in insulated contact with each other whereby said housing side members normally retain said busbars in said side-by-side contacting relation.

5. An electric power busway system comprising:
   (a) a plurality of relatively wide thin flat busbar conductors each having a relatively thin coating of insulating material thereon;
   (b) said busbar conductors being positioned in side-by-side contacting relation with the opposite edges thereof in substantially common planes;
   (c) an elongated metallic housing for said insulated busbar conductors comprising a pair of relatively thin sheet metal side wall portions extending in directly contacting relation to the insulating coating surfaces of the outermost busbar conductors of said group of busbar conductors;
   (d) means interconnecting said side wall portions immediately above and below said plurality of busbar conductors so as to resist outward movement thereof and to retain said busbar conductors in directly side-by-side contacting relation, said interconnecting means comprising a pair of elongated relatively thin sheet metal tie-plates and means interconnecting said tie-plates to said side wall portions respectively at a multiplicity of points along the length of said busway system;
   (e) said tie plates each having an intermediate portion thereof offset from the general plane thereof to resiliently oppose elongation of said tie plates in a transverse direction and thereby to resiliently oppose separation of said side wall portions and of said busbar conductors.

6. An electric power busway section comprising:
   (a) a plurality of relatively wide thin flat busbar conductors each having a relatively thin coating of insulating material thereon;
   (b) said busbar conductors being positioned in directly contacting side-by-side relation with said opposite edges thereof substantially in common planes;
   (c) housing means retaining said busbar conductors in said side-by-side contacting relation, said housing means comprising a pair of relatively thin planar side wall members of sheet metallic material each having an intermediate portion directly in contact with the insulated surface of the outermost ones of said busbar conductors, said side wall members each having an intermediate portion thereof directly above and below said busbar conductors configuration outwardly bent from the general plane thereof and return-bent to form a generally U-shaped cross-section rib portion extending lengthwise of said side wall member;

(d) means interconnecting said side wall members and thereby holding said busbar conductors in said directly side-by-side contacting relation, with connecting means comprising a pair of elongated sheet metallic tie plates, each of said tie plates having an edge portion extending within one of said U-shaped rib portions of said side wall members, and means rigidly connecting said tie plate edge portions to said U-shaped rib portions;

(e) said tie plates each having an intermediate portion thereof deformed away from said plurality of busbar conductors whereby to resiliently resist outward movement of said housing side wall members away from each other when subject to short-circuit current forces.

7. An electric power busway system comprising:
(a) a group of relatively wide thin flat busbar conductors each having a relatively thin coating of insulating material thereon;
(b) means supporting said busbar conductors in directly side-by-side contacting relation with said top and bottom edges substantially in common planes;
(c) housing means restraining said group of busbar conductors in said side-by-side contacting relation, said housing means comprising a pair of opposite side wall members of sheet metallic material and a pair of intermediate tie-plate members extending between and interconnecting said side wall members above and below said group of busbar conductors;
(d) said side wall members each having a pair of U-shaped cross-section outwardly-directed ribs formed therein and extending lengthwise thereof, said wall members being formed in a bowed configuration prior to assembly so that the intermediate portions thereof are closer together than the outer edge portions thereof, and said U-shaped ribs extend at an angle other than a right angle to the plane of the side wall surfaces of said busbar conductors;
(e) said intermediate tie-plate members having at least the edge portions thereof bent at an angle to conform substantially to the angle of said ribs, whereby during assembly, said edge portions of said tie-plate members readily enter said U-shaped ribs of said wall members.

References Cited
UNITED STATES PATENTS 3,183,299   5/1965   Johnston et al. _____ 174—99
3,187,086   6/1965   Moodie et al. _____ 174—68

LARAMIE E. ASKIN, *Primary Examiner.*